US 11,148,156 B2

(12) United States Patent
Furukawa et al.

(10) Patent No.: US 11,148,156 B2
(45) Date of Patent: Oct. 19, 2021

(54) SWITCHING VALVE AND INTERMITTENT AIR BLOW GUN

(71) Applicant: Koganei Corporation, Koganei (JP)

(72) Inventors: Yoshihiro Furukawa, Koganei (JP); Koichi Teraki, Koganei (JP)

(73) Assignee: Koganei Corporation, Tokyo (JP)

( * ) Notice: Subject to any disclaimer, the term of this patent is extended or adjusted under 35 U.S.C. 154(b) by 174 days.

(21) Appl. No.: 16/276,816

(22) PCT Filed: Aug. 4, 2017

(86) PCT No.: PCT/JP2017/028388
§ 371 (c)(1),
(2) Date: Feb. 15, 2019

(87) PCT Pub. No.: WO2018/043032
PCT Pub. Date: Mar. 8, 2018

(65) Prior Publication Data
US 2019/0232312 A1 Aug. 1, 2019

(30) Foreign Application Priority Data

Aug. 29, 2016 (JP) .............................. JP2016-166987

(51) Int. Cl.
*F16K 21/00* (2006.01)
*B05B 1/00* (2006.01)
(Continued)

(52) U.S. Cl.
CPC ............. *B05B 12/06* (2013.01); *B05B 1/005* (2013.01); *B08B 5/02* (2013.01); *F16K 21/00* (2013.01);
(Continued)

(58) Field of Classification Search
CPC ........... B05B 1/005; B05B 12/06; B08B 5/02; F16K 21/00; F16K 21/04; F16K 31/143
See application file for complete search history.

(56) References Cited

U.S. PATENT DOCUMENTS 3,106,937 A * 10/1963 Sands ................... F16K 17/168
137/613
4,052,008 A * 10/1977 Rogers ................... B05B 1/005
239/526

(Continued)

FOREIGN PATENT DOCUMENTS

| JP | H06235476 A | 8/1994 |
| JP | H07190221 A | 7/1995 |
| JP | 2014083518 A | 5/2014 |

OTHER PUBLICATIONS

International Search Report for PCT Serial No. PCT/JP2017/028388 dated Oct. 10, 2017.

*Primary Examiner* — Alex M Valvis
(74) *Attorney, Agent, or Firm* — McCormick, Paulding & Huber PLLC

(57) ABSTRACT

An intermittent air blow gun (10a) has a switching valve (26) including a switching-valve case (27) and a valve assembly (31), and the valve assembly (31) includes: a valve body (53) configured to open and close a valve hole; a small-diameter piston (33) partitioning so as to form a small-diameter pilot chamber (34); and a large-diameter piston (37) partitioning so as to form a large-diameter pilot chamber (38). The valve body (53) is switched to a closed position when air discharged from an inside of the switching-valve case (27) to an air discharge section (24) is supplied to the large-diameter pilot chamber (38) through a bypass flow path (77), and the valve body (53) is switched to an open position when air is exhausted.

10 Claims, 12 Drawing Sheets

(51) Int. Cl.
  *B08B 5/02*  (2006.01)
  *F16K 31/143*  (2006.01)
  *F16K 21/04*  (2006.01)
  *B05B 12/06*  (2006.01)
  *F16K 31/124*  (2006.01)

(52) U.S. Cl.
  CPC ............ *F16K 21/04* (2013.01); *F16K 31/124* (2013.01); *F16K 31/143* (2013.01)

(56) References Cited

U.S. PATENT DOCUMENTS

| | | | | |
|---|---|---|---|---|
| 4,124,164 A | * | 11/1978 | Bachman | B05B 1/005 239/533.15 |
| 7,219,850 B2 | * | 5/2007 | Burnworth | B05B 1/3013 137/503 |
| 9,275,823 B2 | * | 3/2016 | Rasmussen | H01J 37/16 |

* cited by examiner (A)

(B)

(A)

(B)

(A)

(B)

(A)

(B)

SWITCHING VALVE AND INTERMITTENT AIR BLOW GUN

CROSS-REFERENCE TO RELATED APPLICATIONS

This application is a National Stage application of International Patent Application No. PCT/JP2017/028388, filed on Aug. 4, 2017, which claims priority to Japanese Patent Application Number 2016-166987, filed on Aug. 29, 2016, each of which is hereby incorporated by reference in its entirety.

TECHNICAL FIELD

The present invention relates to a switching valve and an intermittent air blow gun for intermittently discharging compressed air toward an object.

BACKGROUND

An intermittent air blow gun is used for intermittently spraying, with air, an object such as a workpiece and a surface to be coated, to remove chips of the workpiece, dust on the surface, and the like. Such chips and dust can be efficiently removed by intermittently, i.e., fitfully spraying the object with air.

An intermittent air blow gun for blowing off and removing chips generated in a grinding step is described in Japanese Patent Application Laid-Open Publication No. 2014-83518. The intermittent air blow gun includes an air blow gun body into which a switch lever and an air ejection flow path are incorporated. In the intermittent air blow gun, an air supply flow path is connected to the air blow gun body, and air from an air pressure source is supplied to the air ejection flow path in the air blow gun body through the air supply flow path. An opening and closing valve in which a spring force is biased in an opening direction of the air supply flow path is provided to the air supply flow path. A bypass flow path is connected upstream of the opening and closing valve, and a pilot valve in which a spring force is biased in a closing direction of the bypass flow path is provided to the bypass flow path. In the air blow gun, the opening and closing valve and s spring return type of pilot valve on are provided outside the air blow gun body, so that air is intermittently ejected from a discharge opening.

An air discharge apparatus including a communication disconnection mechanism is shown in FIG. 3 of Japanese Patent Application Laid-Open Publication No. H07-190221, and the communication disconnection mechanism acts in a state allowing a supply side passage and an exhaust side passage to establish communication with each other and in a state disconnecting the communication. The air discharge apparatus includes a main body in which a movement space as a valve hole is longitudinally formed. The communication disconnection mechanism includes: two spool-type valve bodies that slide in the movement space; and a fitting shaft through which these valve bodies are coupled to each other. The supply side passage and the exhaust side passage extend in the lateral direction of the main body to communicate with the movement space, and air flowing from the supply side passage to the exhaust side passage through the movement space flows in the crossing direction of the main body. The communication disconnection mechanism acts in the state allowing the supply side passage and the exhaust side passage to establish communication with each other and in the state disconnecting the communication, thereby intermittently ejecting air from an air discharge section.

SUMMARY

As described in Japanese Patent Application Laid-Open Publication No. 2014-83518, it is possible to reduce the size of the body in the air blow gun by disposing the opening and closing valve and the pilot valve outside the body in the air blow gun. However, since the opening and closing valve is provided to the air supply flow path through which the air pressure source is connected to the body in the air blow gun, and the pilot valve is provided to the bypass flow path, the opening and closing valve and the pilot valve are necessarily disposed outside the air blow gun body. Therefore, since the opening and closing valve and the pilot valve are disposed in the air supply flow path and the bypass flow path composed of hoses and tubes, and dragged when the object is sprayed with air, whereby the workability in operation of blowing off chips is deteriorated.

As described in Japanese Patent Application Laid-Open Publication No. H07-190221, the air discharge apparatus in which the supply side passage and the exhaust side passage laterally extend and are formed in the apparatus body is applicable when the apparatus is singly used. However, upsizing of the air blow gun body is required for incorporating the air discharge apparatus having such a structure as a switching valve into the air blow gun body. Moreover, the great meandering of the flow of air is required for incorporating the air discharge apparatus having the structure into the air blow gun. Therefore, it is necessary to increase the width dimension of the switching valve, so that it is impossible to apply the air discharge apparatus to the air blow gun. In addition, it is not possible to discharge a large amount of air from a discharge opening in the conventional air discharge apparatus reduced in size in order to incorporate the air discharge apparatus into the air blow gun.

An object of the present invention is to achieve the reduction in size of a switching valve and an intermittent air blow gun while securing the discharge amount of air.

According to one aspect of the present invention, there is provided a switching valve comprising: a switching-valve case in which an air intake section provided with a switching-valve input port and a small-diameter hole are provided to one end of the switching-valve case, in which an air discharge section provided with a switching-valve output port and a large-diameter hole larger in inner diameter than the small-diameter hole are provided to the other end of the switching-valve case, and in which a valve chamber configured to communicate with the switching-valve input port and the switching-valve output port is provided; a valve seat member provided in the valve chamber and having a valve hole; a valve assembly comprising: a main shaft provided with a valve body configured to open and close the valve hole; a small-diameter piston incorporated into the small-diameter hole so as to form a small-diameter pilot chamber, and a large-diameter piston incorporated into the large-diameter hole so as to form a large-diameter pilot chamber, and arranged in the switching-valve case; and a bypass flow path through which the switching-valve output port and the large-diameter pilot chamber communicate with each other.

According to another aspect of the present invention, there is provided an intermittent air blow gun comprising: the above-mentioned switching valve; and a trigger valve to be switched between an actuation position allowing air supplied to the air intake section to be supplied to the small-diameter pilot chamber and an actuation stop position stopping air from being supplied to the small-diameter pilot chamber, and exhausting air in the small-diameter pilot chamber to an outside.

In a switching valve having a switching-valve case, since an air intake section provided with a switching-valve input port and a small-diameter hole are provided to one end of the switching-valve case, an air discharge section provided with a switching-valve output port and a large-diameter hole larger in inner diameter than the small-diameter hole are provided to the other end of the switching-valve case, a valve assembly is provided in the switching-valve case, and the valve assembly includes: a valve seat member disposed in the valve chamber of the switching-valve case and including a valve hole; a main shaft provided with a valve body that opens and closes the valve hole; a small-diameter piston incorporated into the small-diameter hole so as to form a small-diameter pilot chamber; and a large-diameter piston incorporated into the large-diameter hole so as to form, together with the other end of the switching-valve case, a large-diameter pilot chamber. Through a bypass flow path, air discharged from the air discharge section is supplied to the large-diameter pilot chamber to switch the valve body to a closed position, air is exhausted from the large-diameter pilot chamber to switch the valve body to an open position, and air supplied to the air intake section is intermittently discharged from the air discharge section, the switching-valve case can be formed into an elongated shape, the switching valve can be incorporated into the intermittent air blow gun while securing the discharge amount of air.

Since the intermittent air blow gun has a switching valve and a trigger valve, and the trigger valve is configured to switch between an actuation position at which air supplied to the air intake section is supplied to the small-diameter pilot chamber and an actuation stop position at which supply of air to the small-diameter pilot chamber is stopped, and air in the small-diameter pilot chamber is exhausted to outside, and the elongated and downsized switching valve is incorporated into the intermittent air blow gun, the intermittent air blow gun is reduced in size, and a spraying operation of spraying an object with intermittent air can be easily performed. Even when the intermittent air blow gun is reduced in size, the flow rate of air discharged from a discharge nozzle can be secured.

DETAILED DESCRIPTION

Figure 1:
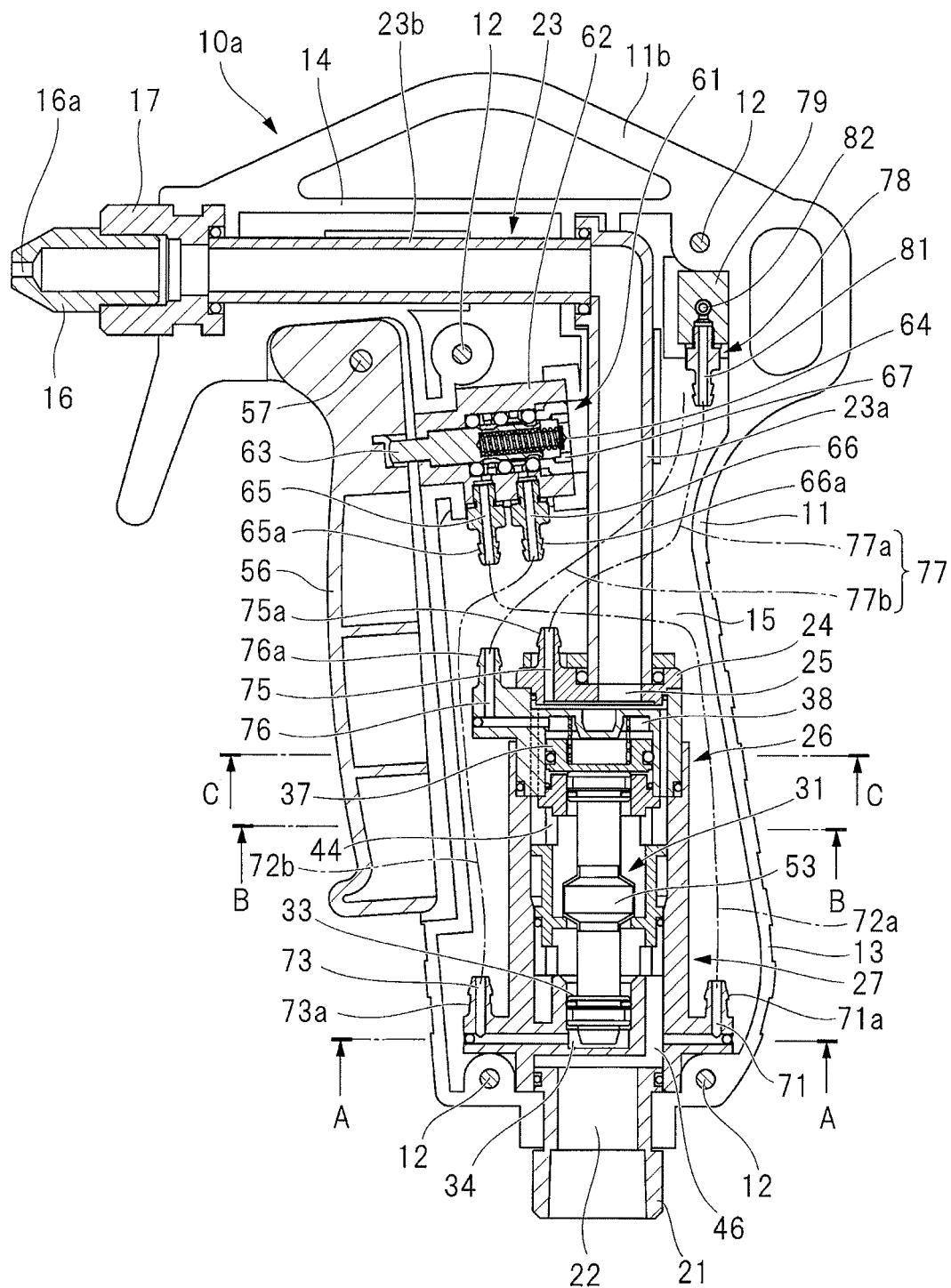
FIG. 1 is a longitudinal sectional view of an intermittent air blow gun according to one embodiment of the present invention.
Figure 2:
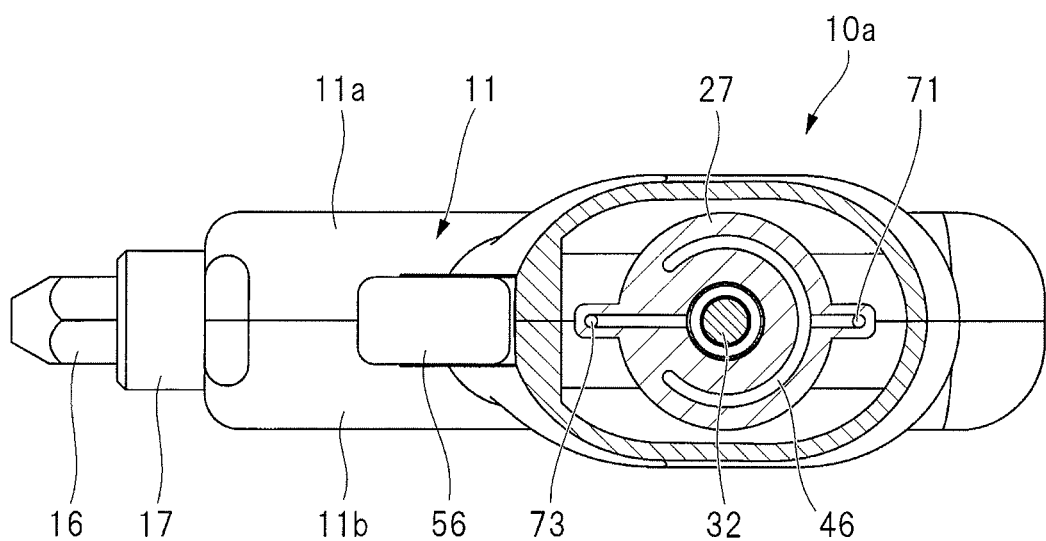
FIG. 2 is a sectional view taken along the line A-A of FIG. 1.
Figure 3:
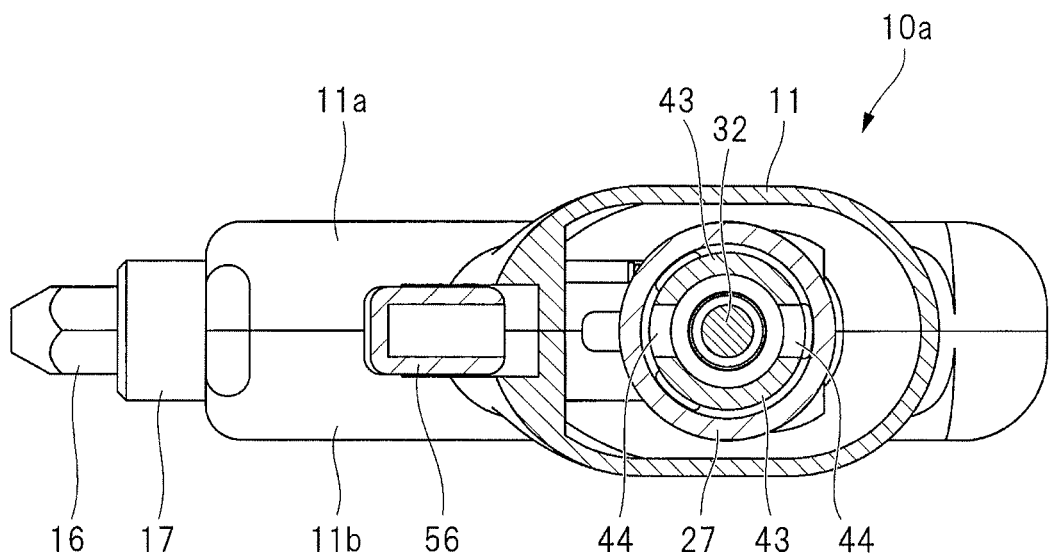
FIG. 3 is a sectional view taken along the line B-B of FIG. 1.
Figure 4:
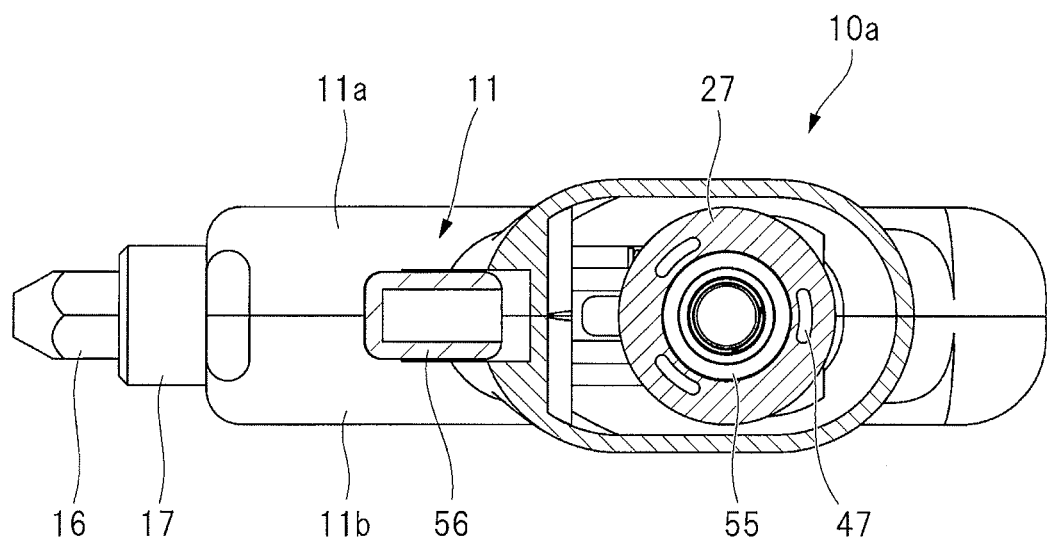
FIG. 4 is a sectional view taken along the line C-C of FIG. 1.

Hereinafter, embodiments of the present invention will be described in detail with reference to the drawings. An intermittent air blow gun 10a includes a case 11. The case 11 includes two case pieces 11a and 11b, and as shown in FIGS. 2 to 4, it is assembled by causing the case pieces 11a and 11b to abut on each other. As shown in FIG. 1, the case pieces 11a and 11b are fastened with a plurality of screw members 12. FIG. 1 shows a surface of one case piece 11b, that comes face-to-face with a surface of the other case piece.

The case 11 includes: a grip section 13 that is gripped by an operator; and a gun cylinder section 14 integrally provided to the leading end of the grip section 13, and the gun cylinder section 14 extends in a direction approximately perpendicular to the longitudinal direction of the grip section 13. A housing space 15 is provided in the case 11. A discharge nozzle 16 including a discharge opening 16a is fixed to a nozzle holder 17, and the discharge nozzle 16 is attached to the leading end of the gun cylinder section 14 by the nozzle holder 17. An air intake section 21 is attached to the base end of the grip section 13, and the air intake section 21 includes a switching-valve input port 22. A supply pipe including a supply hose and the like (not shown) is connected to the air intake section 21, and air from an air supply source is supplied to the switching-valve input port 22 through the supply pipe.

An air discharge pipe 23 is incorporated into the case 11. The air discharge pipe 23 includes: an upstream side section 23a that extends in a longitudinal direction in the grip section 13; and a downstream side section 23b that is coupled to the leading end of the upstream side section 23a. The downstream side section 23b extends in the gun cylinder section 14 in a direction approximately perpendicular to the upstream side section 23a, and is connected to the nozzle holder 17. An air discharge section 24 is connected to the upstream side section 23a of the air discharge pipe 23. The air discharge section 24 is arranged approximately coaxially with respect to the air intake section 21 and is directed in an opposite direction, and the air intake section 21 and the air discharge section 24 form part of a switching-valve case 27. The air discharge section 24 includes a switching-valve output port 25, and the switching-valve output port 25 is allowed to communicate with the inside of the air discharge pipe 23. At least one of the air intake section 21 and the air discharge section 24 may be integrally provided to the switching-valve case 27.

Figure 5:
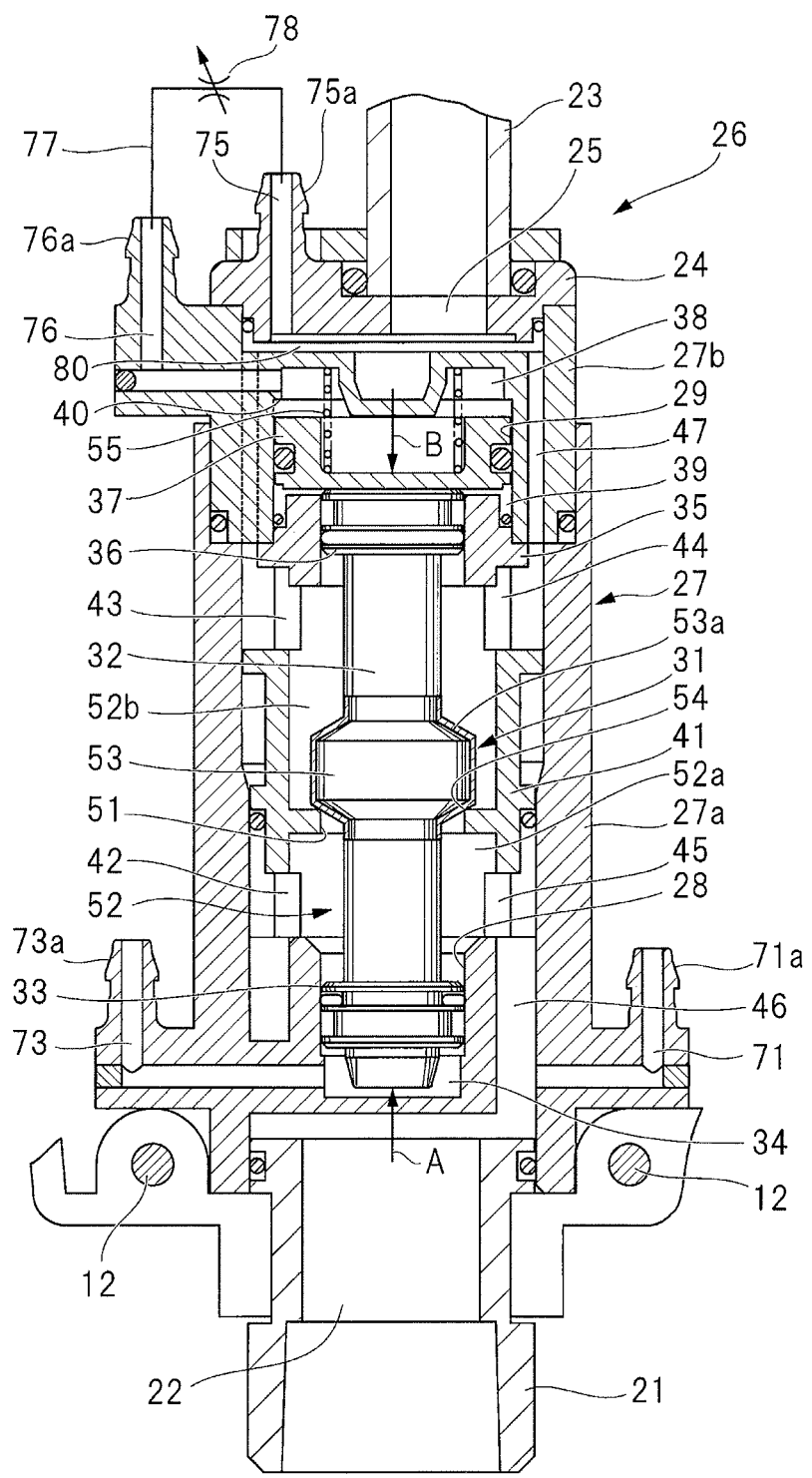
FIG. 5 is an enlarged sectional view of a main valve shown in FIG. 1.

The switching-valve case 27 extends in the longitudinal direction of the grip section 13 from the base end of the grip section 13. A switching valve 26 includes the switching-valve case 27. As shown in FIG. 5, the switching-valve case 27 includes a first case piece 27a attached to the air intake section 21 and a second case piece 27b attached to the first case piece 27a as well as the air intake section 21 and the air discharge section 24, and the air discharge section 24 is attached to the second case piece 27b. In other words, the first case piece 27a and the second case piece 27b are arranged between the air intake section 21 and the air discharge section 24.

As shown in FIG. 5, a small-diameter hole 28 is provided to one end of the switching-valve case 27, i.e., an end portion of the switching-valve case 27, located on the same side as the air intake section 21. The small-diameter hole 28 is a bottomed hole and adjacent to the switching-valve input port 22 in an axial direction thereof through an end wall the same side as the base end of the switching-valve case 27. A large-diameter hole 29 is provided to the other end of the switching-valve case 27, i.e., an end portion of the switching-valve case 27, located on the same side as the air discharge section 24. The large-diameter hole 29 is also a bottomed hole and adjacent to the switching-valve output port 25 in an axial direction thereof through an end wall the same side as to the leading end of the switching-valve case 27. The large-diameter hole 29 is larger in inner diameter than the small-diameter hole 28.

As described above, the small-diameter hole 28 is provided to one end portion of the switching-valve case 27 and inside the air intake section 21. The large-diameter hole 29 is provided to the other end portion of the switching-valve case 27 and inside the air discharge section 24.

A valve assembly 31 is attached in an axial direction and inside the switching-valve case 27. The valve assembly 31 reciprocates in the axial direction in the switching-valve case 27. The valve assembly 31 includes a main shaft 32, and a small-diameter piston 33 slidably incorporated into the small-diameter hole 28 is provided to the base end of the main shaft 32. A sealing member configured to come into slide contact with the small-diameter hole 28 is mounted to the small-diameter piston 33, and the small-diameter piston 33 and the small-diameter hole 28 form a small-diameter pilot chamber 34.

As shown in FIG. 5, a main shaft guide 35 having a ring shape is incorporated into the switching-valve case 27, and the main shaft guide 35 is fixed to the case piece 27b. A flange 36 to be slidably guided to the inner peripheral surface of the main shaft guide 35 is provided to the leading end of the main shaft 32, and a sealing member configured to come into slide contact with the inner peripheral surface of the main shaft guide 35 is mounted to the flange 36. A large-diameter piston 37 is slidably incorporated into the large-diameter hole 29, and a large-diameter pilot chamber 38 is formed between the end wall closer to the leading end of the switching-valve case 27 and the large-diameter piston 37. The large-diameter piston 37 is allowed to abut on an end surface of the main shaft 32, and the small-diameter piston 33 provided integrally to the main shaft 32, the large-diameter piston 37, and the main shaft 32 form the valve assembly 31. The large-diameter piston 37 and the main shaft 32 may be coupled with each other.

The valve assembly 31 is slidably retained by the small-diameter piston 33 disposed on the same side as the base end and the flange 36 disposed on the same side as the leading end. In other words, both ends of the valve assembly 31 are retained, and therefore, the valve assembly 31 is stably retained and slidably movable in the axial direction.

A perforated chamber 39 is formed by the large-diameter hole 29. The perforated chamber 39 is provided on the opposite side of the large-diameter pilot chamber 38 with respect to the large-diameter piston 37. The perforated chamber 39 is configured to communicate with the outside of the switching-valve case 27 through a through hole (not shown), i.e., an air bleed port. When the large-diameter piston 37 is driven by air supplied to the large-diameter pilot chamber 38, air in the perforated chamber 39 is exhausted outside. In contrast, external air flows into the perforated chamber 39 when the large-diameter piston 37 is driven in a reverse direction. The movement of the large-diameter piston 37 in the reverse direction is restricted by a stopper 40.

A valve seat member 41 having a cylindrical shape is provided in the switching-valve case 27, and spacers 42, 43 are arranged on both sides of the valve seat member 41 in the axial direction thereof. The valve seat member 41 may be integrated with the switching-valve case 27. As shown in FIG. 3, the spacer 43 has an arc cross-sectional shape, includes two members arranged in the inside of the switching-valve case 27 through a gap, and provided to the valve seat member 41. A passage 44 is formed between the two members forming the spacer 43. The spacer 42 also similarly includes two arc-shaped members provided to the valve seat member 41, and a passage 45 is formed between the two members. As each of the spacers 42, 43, a ring-shaped portion through which a plurality of holes extend so as to penetrate and formed in a radial direction may be provided integrally to the valve seat member 41.

An input communication hole 46 is formed in the switching-valve case 27 in parallel to the small-diameter hole 28, so that the passage 45 communicates with the switching-valve input port 22 through the input communication hole 46. An output communication hole 47 is formed in the switching-valve case 27 in parallel to the large-diameter hole 29, so that the passage 44 communicates with the switching-valve output port 25 through the output communication hole 47. A valve hole 51 is formed in the valve seat member 41, and a valve chamber 52 composed of a primary chamber 52a upstream of the valve hole 51 and a secondary chamber 52b downstream of the valve hole 51 is formed in the switching-valve case 27. A partition between the valve chamber 52 and the perforated chamber 39 is achieved by the main shaft guide 35 and the flange 36.

As described above, the switching-valve input port 22, the small-diameter pilot chamber 34, the valve chamber 52, the large-diameter pilot chamber 38, and the switching-valve output port 25 are arranged inside the switching valve 26 in this order from one end portion to the other end portion of the valve assembly 31 along a moving direction of the valve assembly 31. As a result, the switching valve can be reduced in size so as to have an elongated shape.

A valve body 53 is provided to the main shaft 32. The valve body 53 is formed of a large-diameter section provided integrally to the main shaft 32 and a seal section 53a provided to the outer peripheral surface thereof. The valve body 53 is a poppet type, and configured to open and close the valve hole 51 by axial reciprocation of the valve assembly 31. When the valve body 53 comes into contact with a valve seat section 54 of the valve seat member 41, the valve body 53 is located so as to take a closed position at which the valve hole 51 is closed. When the valve body 53 leaves the valve seat section 54, the valve body 53 is located at an open position at which the valve hole 51 is opened. When the valve body 53 is located at the closed position, the communication between the primary chamber 52a and the secondary chamber 52b is disconnected. As a result, the flow of air from the switching-valve input port 22 to the switching-valve output port 25 is disconnected. In contrast, when the valve body 53 is located at the open position, the primary chamber 52a is allowed to communicate with the secondary chamber 52b through the valve hole 51. As a result, air supplied to the switching-valve input port 22 flows to the switching-valve output port 25 through the input communication hole 46, the primary chamber 52a, the valve hole 51, the secondary chamber 52b, and the output communication hole 47.

To bias the valve body 53 toward the closed position by a spring force, a compression coil spring 55 is mounted as a spring member to the large-diameter pilot chamber 38. The spring force of the compression coil spring 55 is applied to the valve assembly 31 so that the valve body 53 moves toward the closed position, even when the intermittent air blow gun 10a is operated in any direction under a state where air is not supplied to the switching-valve input port 22 of the air intake section 21.

In the valve assembly 31, the small-diameter piston 33 receives thrust in a direction in which the valve body 53 opens the valve hole 51, i.e., a pressing force (A), by air supplied into the small-diameter pilot chamber 34. When the pressing force (A) allows the valve body 53 to be driven in an opening direction of the valve hole 51, the main shaft 32 allows the large-diameter piston 37 to be driven in a shrinking direction of the large-diameter pilot chamber 38. At this time, the perforated chamber 39 is increased in volume, and air flows from the outside.

In contrast, by supplying air to the small-diameter pilot chamber 34 and the large-diameter pilot chamber 38, the thrust of the total of pressing force of air, applied in a direction closing the valve hole 51, and a spring force, i.e., a pressing force (B) is applied to the large-diameter piston 37. The pressing force (B) is greater than the pressing force (A) applied in the opening direction of the valve body 53. As described above, air supplied to the large-diameter pilot chamber 38 allows the valve body 53 to be driven in the closing direction of the valve hole 51. When air is supplied to the large-diameter pilot chamber 38 to increase the volume of the large-diameter pilot chamber 38, the perforated chamber 39 is shrunk to exhaust air from the perforated chamber 39 to the outside.

The switching valve 26 is a double-pilot-type opening and closing valve in which the pilot chambers are provided in respective ends of the valve assembly 31, as described above. When the valve hole 51 is opened by pilot pressure, air supplied to the switching-valve input port 22 is ejected to the switching-valve output port 25, guided into the air discharge pipe 23, and discharged toward an object from the discharge opening 16a.

As shown in FIG. 1, a trigger lever 56 is swingably provided on the case 11. The base end of the trigger lever 56 is attached, with a support pin 57, to a portion closer to the grip section 13 in the gun cylinder section 14, and extends along the outside of the grip section 13.

A trigger valve 61 to be operated by the trigger lever 56 is positioned at the leading end side of the grip section 13, and provided in the case 11. The trigger valve 61 has: a valve housing 62 fixed to the front section of the grip section 13; and a valve shaft 63 that abuts on the trigger lever 56, the valve shaft 63 is housed in the valve housing 62, and the valve shaft 63 reciprocates in an axial direction. A spring force in a direction toward the trigger lever 56 is biased to the valve shaft 63 by a compression coil spring 64 as a spring member. Accordingly, a spring force in a direction in which the leading end of the trigger lever 56 leaves the grip section 13 is biased to the trigger lever 56 by the compression coil spring 64. When an operator manually operates the trigger lever 56 against the spring force, the trigger lever 56 is switched to occupy an actuation position. In contrast, the trigger lever 56 is switched to occupy an actuation stop position by moving the hand of the operator off the trigger lever 56. The trigger lever 56 constitutes operation means.

An input fitting 65a in which a trigger input port 65 is formed and an output fitting 66a in which a trigger output port 66 is formed are provided to the valve housing 62. Furthermore, an exhaust port 67 is provided to an end surface of the valve housing 62. The trigger input port 65 is allowed to communicate with the trigger output port 66 by operating the trigger lever 56 so that the trigger lever 56 occupies the actuation position. When the trigger lever 56 occupies the actuation stop position, the trigger input port 65 and the trigger output port 66 are prevented from communicating with each other, and the trigger output port 66 is allowed to communicate with the exhaust port 67.

An air-supply fitting 71a having an air-supply port 71 is provided to the switching-valve case 27. The air-supply port 71 communicates with the switching-valve input port 22 through the input communication hole 46. The air-supply fitting 71a is connected to the input fitting 65a through a trigger-supply flow path 72a including a tubular member such as a hose. Air supplied to the switching-valve input port 22 is supplied to the trigger input port 65 through the trigger-supply flow path 72a.

A pilot fitting 73a having a first pilot port 73 is provided to the switching-valve case 27. The first pilot port 73 communicates with the small-diameter pilot chamber 34. The pilot fitting 73a is connected to the output fitting 66a through a trigger-output flow path 72b including a tubular member such as a hose. Air output from the trigger output port 66 is supplied to the small-diameter pilot chamber 34 through the trigger-output flow path 72b. As shown in FIG. 2, the air-supply port 71 and the first pilot port 73 are arranged along the cross-sectional longitudinal direction of the grip section 13. As a result, the grip section 13 can have a cross-sectional shape allowing an operator to easily grip the grip section 13.

When the trigger lever 56 is operated by an operator, the trigger valve 61 is switched to occupy an actuation position at which the trigger input port 65 and the trigger output port 66 communicate with each other. When the trigger valve 61 occupies the actuation position, air is supplied from the switching-valve input port 22 of the air intake section 21 to the trigger input port 65 through the trigger-supply flow path 72a, and air is supplied from the trigger output port 66 to the small-diameter pilot chamber 34 through the trigger-output flow path 72b. With the trigger valve 61 switched to occupy the actuation position, air is always supplied to the small-diameter pilot chamber 34. In contrast, when the trigger lever 56 is switched to occupy the actuation stop position without operating the trigger lever 56, the trigger input port 65 and the trigger output port 66 do not communicate with each other, thereby preventing air from being supplied to the small-diameter pilot chamber 34. When the trigger valve 61 is further switched to occupy a stop position, the small-diameter pilot chamber 34 is allowed to communicate with the exhaust port 67 through the trigger-output flow path 72b.

As described above, the small-diameter pilot chamber 34 and the switching-valve input port 22 are allowed to communicate with each other through a trigger flow path 72 including the trigger-supply flow path 72a and the trigger-output flow path 72b. The trigger valve 61 provided in the trigger flow path 72 is configured to switch between a supply state allowing air to be supplied to the small-diameter pilot chamber 34 and a stop state preventing air from being supplied to the small-diameter pilot chamber 34.

An output fitting 75a having an output port 75 is provided to the air discharge section 24, and the output port 75 communicates with the switching-valve output port 25 through a communication chamber 80. A pilot fitting 76a having a second pilot port 76 is provided to the switching-valve case 27, and the second pilot port 76 communicates with the large-diameter pilot chamber 38. The output fitting 75a and the pilot fitting 76a are connected to each other through a bypass flow path 77 including a tube member such as a hose. The second pilot port 76 is provided at a position approximately coaxial with respect to the first pilot port 73, and closer to the front side of the intermittent air blow gun 10a than the output port 75.

A throttle 78 is provided in the case 11. The throttle 78 includes: a throttle block 79 fixed to the case 11, an upstream fitting 81 attached to the throttle block 79, and a downstream fitting (not shown). A throttle flow path 82 is located between the upstream fitting 81 and the downstream fitting, and provided to the throttle block 79, and a flow rate of air can be adjusted by the throttle 78. The bypass flow path 77 has: an upstream side section 77a disposed between the upstream fitting 81 and the output fitting 75a; and a downstream side section 77b disposed between the downstream fitting and the pilot fitting 76a.

A needle valve (not shown) is provided to the throttle block 79, and the needle valve is configured to adjust the opening degree of the throttle flow path 82. As described above, the throttle 78 is a variable throttle valve. The throttle 78 may be a fixed throttle valve instead of the variable throttle valve. In addition, by using the bypass flow path 77 having a small inner diameter, it is possible to obtain the function of a fixed throttle due to the bypass flow path 77.

With the trigger lever 56 operated to supply air to the small-diameter pilot chamber 34, the valve assembly 31 can alternately switch between an ON state in which air is discharged to the discharge opening 16a and an OFF state in which the discharging is stopped, depending on the pressure of air supplied to the large-diameter pilot chamber 38. As a result, air is intermittently discharged from the discharge opening 16a. A discharge time and a discharge stopping time are adjusted by changing the flow rate of air flowing through the bypass flow path 77.

The switching valve 26 is arranged on the base end side of the grip section 13, and the trigger valve 61 is arranged on the leading end side of the grip section 13. The switching valve 26 and the trigger valve 61 are arranged in this order in the longitudinal direction of the elongated grip section 13 which is long and narrow. Accordingly, it is possible to provide the switching valve 26 and the trigger valve 61 in the case 11 without increasing the size in cross section of the grip section 13, and to reduce the size of the intermittent air blow gun 10a.

Each of the trigger-supply flow path 72a, the trigger-output flow path 72b, and the bypass flow path 77 is formed of a tubular member, and these tubular members are put between the switching valve 26 and the case 11. Therefore, the case 11 is reduced in size. In addition, the switching valve 26, the trigger valve 61, and the throttle 78 are incorporated into the case 11. Therefore, in workability of intermittently spraying air toward an object, this is enhanced in comparison with an example in which the switching valve 26 and the throttle 78 are disposed outside the case 11.

Figure 6:
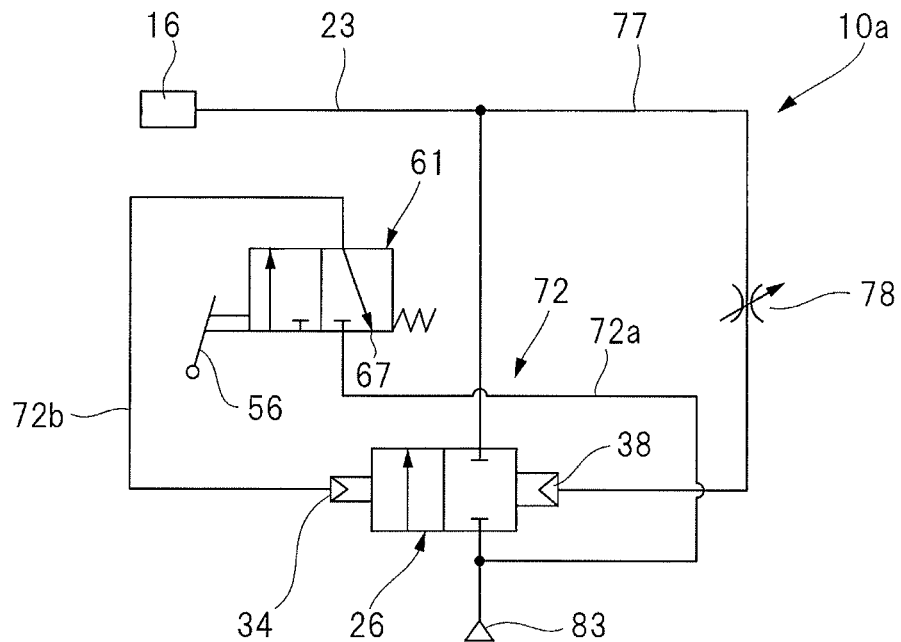
FIGS. 6(a) and 6(b) are pneumatic circuit diagrams each showing the intermittent air blow gun of FIG. 1, FIG. 6(a) showing it under a state where a trigger lever is not being operated, FIG. 6(b) showing it under a state that the trigger lever is being operated.
Figure 6:
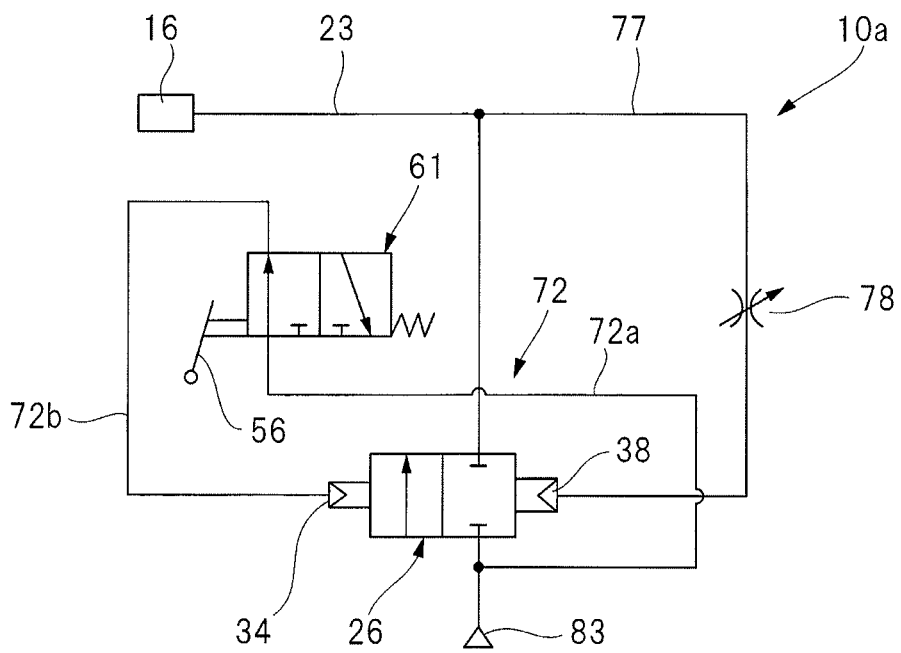
Figure 7:
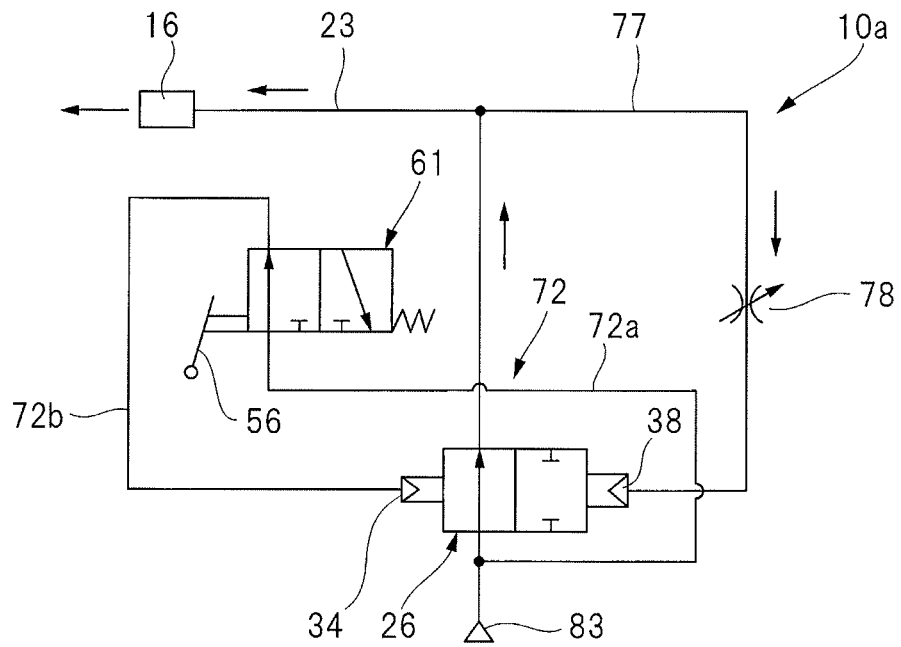
FIGS. 7(a) and 7(b) are pneumatic circuit diagrams each showing the intermittent air blow gun of FIG. 1, FIG. 7(a) showing it with a main valve located at an open position by air supplied to a small-diameter pilot chamber by operating the trigger lever, FIG. 7(b) showing it with the main valve located at an closed position by air supplied to a large-diameter pilot chamber.
Figure 7:
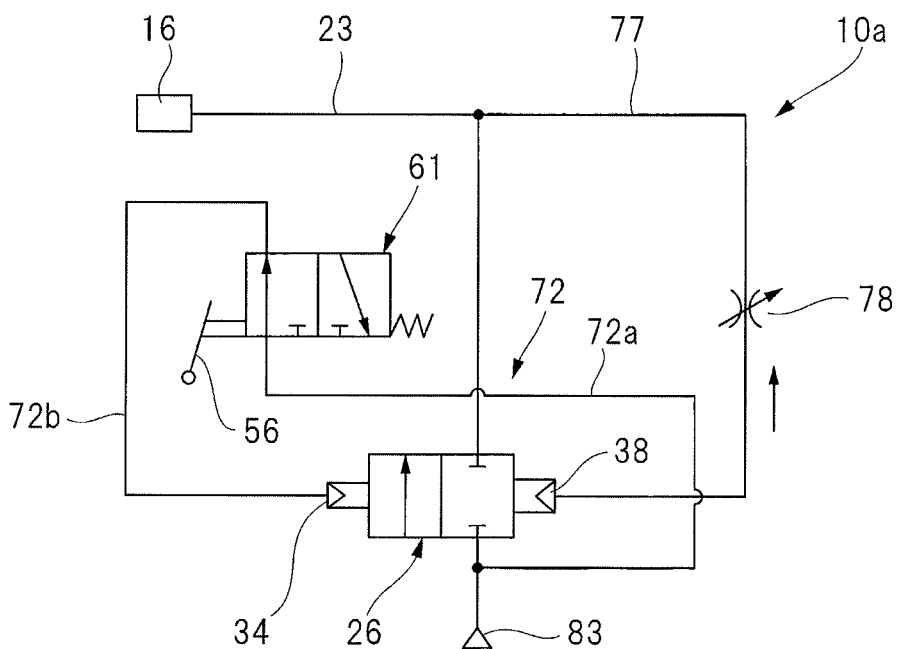

FIGS. 6 and 7 are pneumatic circuit diagrams each showing the intermittent air blow gun 10a. An air supply source 83 is connected to the air intake section 21 through an air-supply pipe (not shown), and the switching-valve input port 22 is connected to the trigger valve 61 through the trigger-supply flow path 72a. As shown in FIGS. 1 and 6(A), when the trigger valve 61 is at an actuation stop position, the small-diameter pilot chamber 34 is allowed to communicate with the exhaust port 67 of the trigger valve 61 and maintained at atmospheric pressure, and the switching valve 26 is in an OFF state in which the valve hole 51 is closed.

With the trigger lever 56 operated to switch the trigger valve 61 to the actuation position as shown in FIG. 6(B), air supplied to the switching-valve input port 22 is supplied to the small-diameter pilot chamber 34 through the trigger valve 61. When air is supplied to the small-diameter pilot chamber 34, the pressing force (A) toward the open position is applied to the valve assembly 31, so that the valve body 53 is separated from the valve seat section 54 to open the valve hole 51. In such a manner, the switching valve 26 is switched, and air from the air supply source 83 passes through the switching valve 26 and is supplied from the air discharge pipe 23 to the discharge nozzle 16 as shown in FIG. 7(A), so that air is sprayed on an object from the discharge opening 16a.

Air supplied to the switching-valve input port 22 is supplied to the large-diameter pilot chamber 38 through the bypass flow path 77 as shown in FIG. 7(A). The flow path through which air is supplied to the large-diameter pilot chamber 38 is throttled by the throttle 78. In addition, the large-diameter pilot chamber 38 is larger in inner diameter than the small-diameter pilot chamber 34. Therefore, the switching valve 26 is maintained in an ON state during the total delay time of a delay caused by the throttle 78 and a delay caused by the large inner diameter of the large-diameter pilot chamber 38 after switching the switching valve 26 to an open position. After the delay time, the pressing force (B) applied to the large-diameter piston 37 becomes greater than the pressing force (A) in the reverse direction. As a result, the large-diameter piston 37 and the valve assembly 31 are moved, and the valve body 53 comes into contact with the valve seat section 54 to close the valve hole 51 and to switch the switching valve 26 to an OFF state.

FIG. 7(B) shows the OFF state of the switching valve 26, in which the valve hole 51 is closed by the valve body 53 due to air supplied to the large-diameter pilot chamber 38. When the switching valve 26 is switched so as to take the OFF state, i.e., a closed position, air in the large-diameter pilot chamber 38 is exhausted to the discharge nozzle 16 through the bypass flow path 77. After a lapse of predetermined OFF retention time, a decrease in pressure in the large-diameter pilot chamber 38 causes the pressing force (A) to be greater than the pressing force (B). Then, the switching valve 26 is switched so as to take an open position shown in FIG. 7(A), i.e., the ON state due to the pressure of air in the small-diameter pilot chamber 34.

Accordingly, with the trigger lever 56 operated, the switching valve 26 is alternately switched, with a predetermined period, between a discharge state in which air is discharged from the discharge nozzle 16, i.e., the ON state, as shown in FIG. 7(A), and a stop state in which the discharge of air is stopped, i.e., the OFF state, as shown in FIG. 7(B).

A period of time for which air is discharged from the discharge nozzle 16, and a period of time for which the discharge is stopped are set by the flow rate of air flowing through the bypass flow path 77. When the throttle 78 is a variable throttle, the discharge time and the discharge stopping time can be varied.

In the switching valve 26 shown in FIG. 5, the switching-valve input port 22 is provided to one end of the switching-valve case 27 which is long and narrow, and the switching-valve output port 25 is provided to the other end thereof. When the switching-valve case 27 which is long and narrow as described above is housed in the inside of the grip section 13 which is long and narrow, the switching-valve input port 22 is located at the lower end of the grip section 13, and the switching-valve output port 25 is located at the upper end of the grip section 13. In other words, the input and output ports are provided at the positions optimal with respect to the internal space of the grip section 13, and therefore, the internal space of the grip section 13 can be efficiently utilized.

Figure 8:
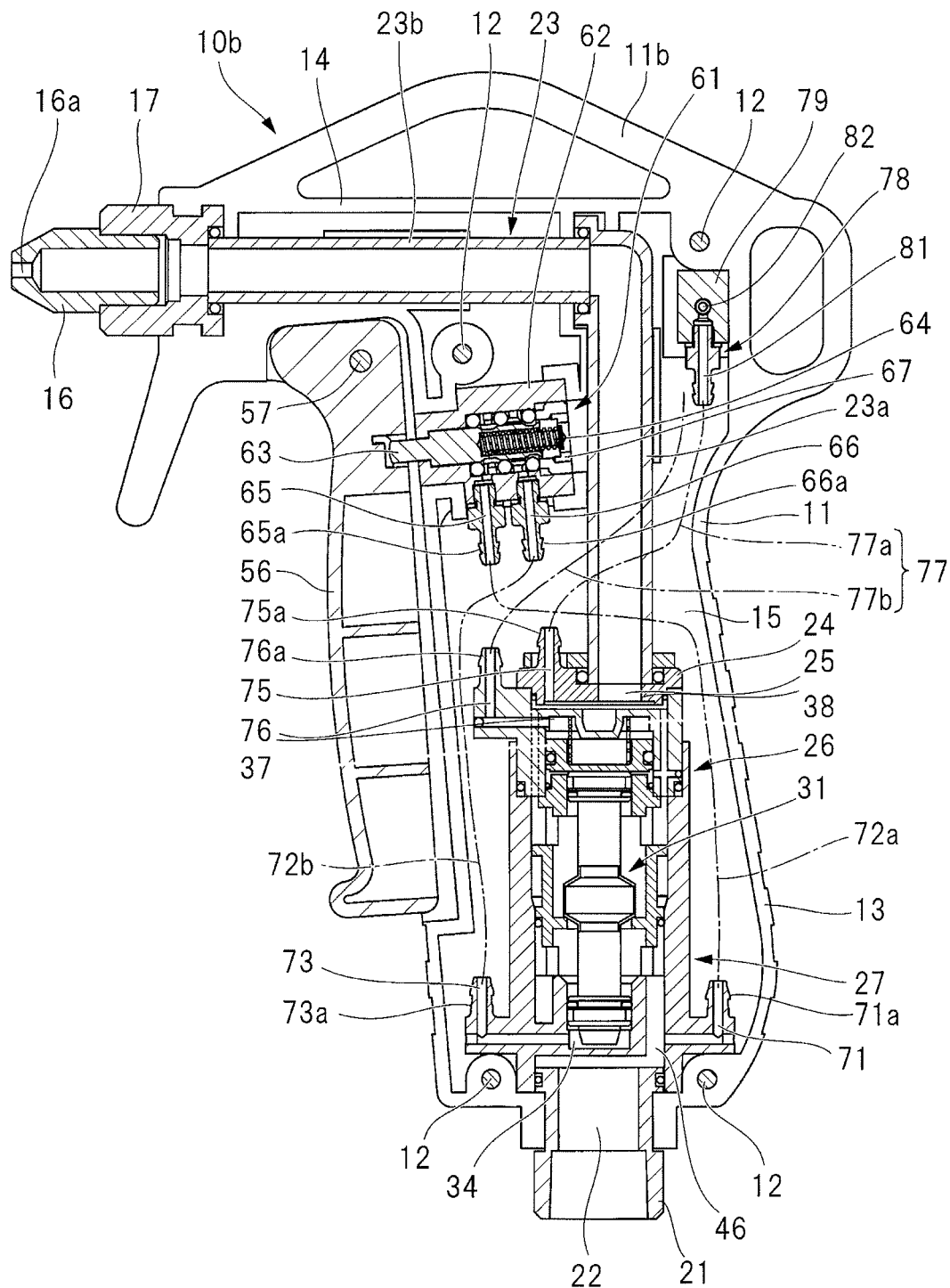
FIG. 8 is a longitudinal sectional view of an intermittent air blow gun according to another embodiment of the present invention.
Figure 9:
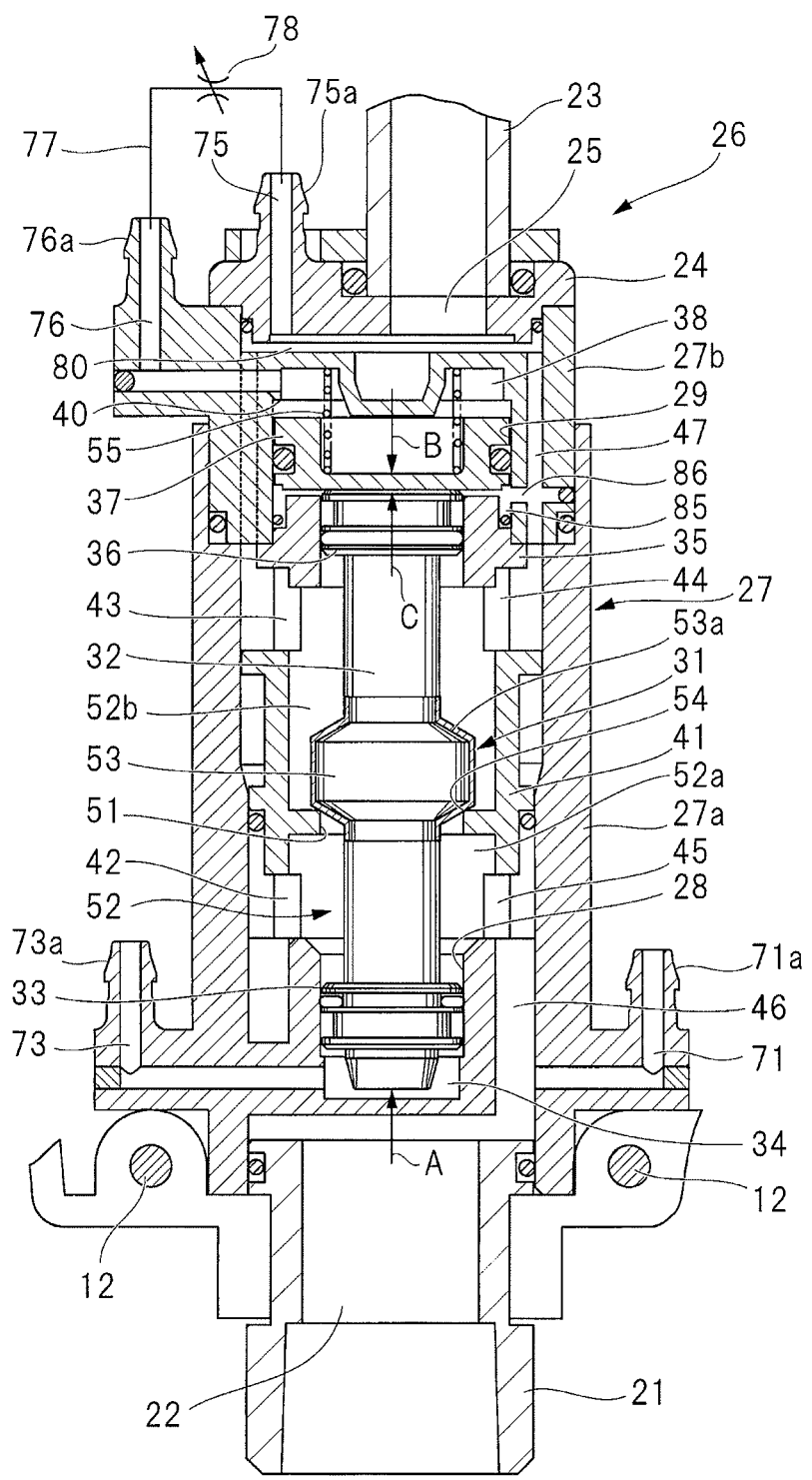
FIG. 9 is an enlarged sectional view of a main valve shown in FIG. 8.

FIGS. 8 and 9 show an intermittent air blow gun 10*b* according to another embodiment. In these figures, members common to those in the embodiment described above are denoted by the same reference characters, and redundant descriptions thereof are omitted below.

In the intermittent air blow gun 10*b*, the perforated chamber 39 of the intermittent air blow gun 10*a* described above is replaced with a delay pilot chamber 85. The delay pilot chamber 85 is formed on the opposite side of a large-diameter pilot chamber 38 with respect to a large-diameter piston 37. In other words, a large-diameter hole 29 is partitioned by the large-diameter piston 37 into the large-diameter pilot chamber 38 located outside the large-diameter piston 37 and the delay pilot chamber 85 located inside the large-diameter piston 37. The large-diameter pilot chamber 38 and the delay pilot chamber 85 are provided in the large-diameter hole 29 and have respective inner diameters the same as each other. In addition, a partition between a valve chamber 52 and the delay pilot chamber 85 is achieved by a main shaft guide 35 and a flange 36.

A delay bypass flow path 86 is provided in a switching-valve case 27, so that the delay pilot chamber 85 communicates with an output communication hole 47 through the delay bypass flow path 86. Accordingly, when a valve hole 51 is opened, air passed through the valve hole 51 is supplied to the large-diameter pilot chamber 38 through the output communication hole 47 and a bypass flow path 77 and supplied from the output communication hole 47 to the delay pilot chamber 85 through the delay bypass flow path 86. As a result, the pressing force (B) of the total of the pressure of air in a direction in which a valve body 53 is closed and a spring force in the same direction as the direction is applied from the large-diameter pilot chamber 38 to the large-diameter piston 37 when the valve hole 51 is opened. At the same time, pressing force (C) in a direction in which the valve body 53 is opened is applied from the delay pilot chamber 85 to the large-diameter piston 37.

The pressing force (C) applied to the large-diameter piston 37 by the delay pilot chamber 85 reaches a maximum value as soon as the valve hole 51 is opened because the valve hole 51 and the delay pilot chamber 85 are arranged near to each other, and there is no throttle in the flow path. In contrast, the pressing force (B) applied to the large-diameter piston 37 by the large-diameter pilot chamber 38 is gradually increased to a maximum value. This is because air is supplied to the large-diameter pilot chamber 38 after having passed through a throttle 78, and therefore, the air pressure of the large-diameter pilot chamber 38 is gradually increased depending on the throttling of the throttle 78 after the valve hole 51 has been opened.

Next, functions of the delay pilot chamber 85 will be described. In the intermittent air blow gun 10*a* in which the delay bypass flow path 86 is not disposed, and which is opened to the atmosphere through the through hole, the pressing force (B) is gradually increased to a maximum value. However, since there is not any pressing force (C) against the pressing force (B), the pressing force (B) moves a main shaft 32 after a lapse of relatively short time.

In contrast, the main shaft 32 is not moved while the pressing force (B) is not sufficiently greater than the pressing force (C) because there is the pressing force (C) against the pressing force (B) when the delay pilot chamber 85 is disposed. After a lapse of time to some extent, the pressure of the large-diameter pilot chamber 38 is sufficiently increased, and the pressing force (B) becomes greater than the pressing force (C). Then, the main shaft 32 is moved in a direction in which the valve hole 51 is closed.

A switching period of a switching valve 26 can be set to be longer when the large-diameter pilot chamber 38 is larger, and a rise in the pressure thereof can be set to be less steep. In contrast, it is difficult to set a rise in the pressure thereof to be less steep when the large-diameter pilot chamber 38 is smaller. This is because the throttling of the throttle 78 has a limitation in minimum value. However, the substantially same effect as allowing a rise in the pressure of the large-diameter pilot chamber 38 to be less steep can be obtained when the delay pilot chamber 85 is disposed, so that the force of delay pilot chamber 85 is against the force of the large-diameter pilot chamber 38. In other words, the same delay effect as that in a case in which the large-diameter pilot chamber 38 is larger can be obtained although the large-diameter pilot chamber 38 is smaller.

As described above, a period of time for which air is discharged from a discharge nozzle 16 and a period of time for which the discharge is stopped can be set to be longer than those in the case of the intermittent air blow gun 10*a* shown in FIGS. 1 to 5 without allowing the dimension of the switching-valve case 27 to be larger when the pilot chambers are disposed in both sides of the large-diameter piston 37. A valve seat section 54 and the valve body 53 are sufficiently spaced because the main shaft 32 is fully stroked between stroke ends when the delay pilot chamber 85 is included. Accordingly, the flow rate of air is high. The main shaft 32 is not fully stroked, a valve is not sufficiently opened, and therefore, the flow rate of air is low because the main shaft 32 is stroked with a short period when the delay pilot chamber 85 is not included. The other structure of the intermittent air blow gun 10*b* is similar to that of the intermittent air blow gun 10*a* except that the delay pilot chamber 85 is provided instead of the perforated chamber 39 of the intermittent air blow gun 10*a*.

Figure 10:
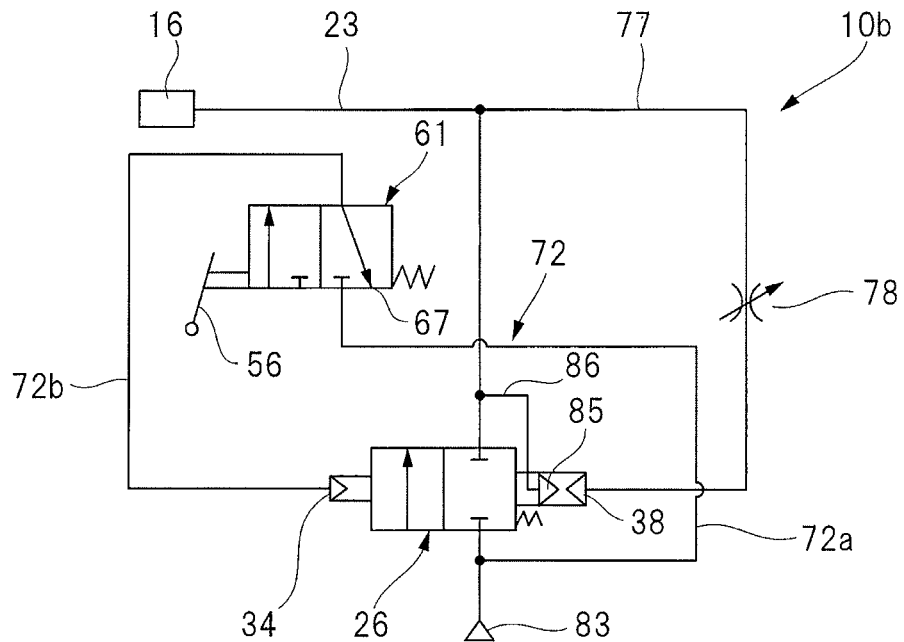
FIGS. 10(a) and 10(b) are pneumatic circuit diagrams each showing the intermittent air blow gun of FIG. 8, FIG. 10(a) showing it under a state that a trigger lever is not being operated, FIG. 10(b) showing it under a state that the trigger lever is being operated.
Figure 10:
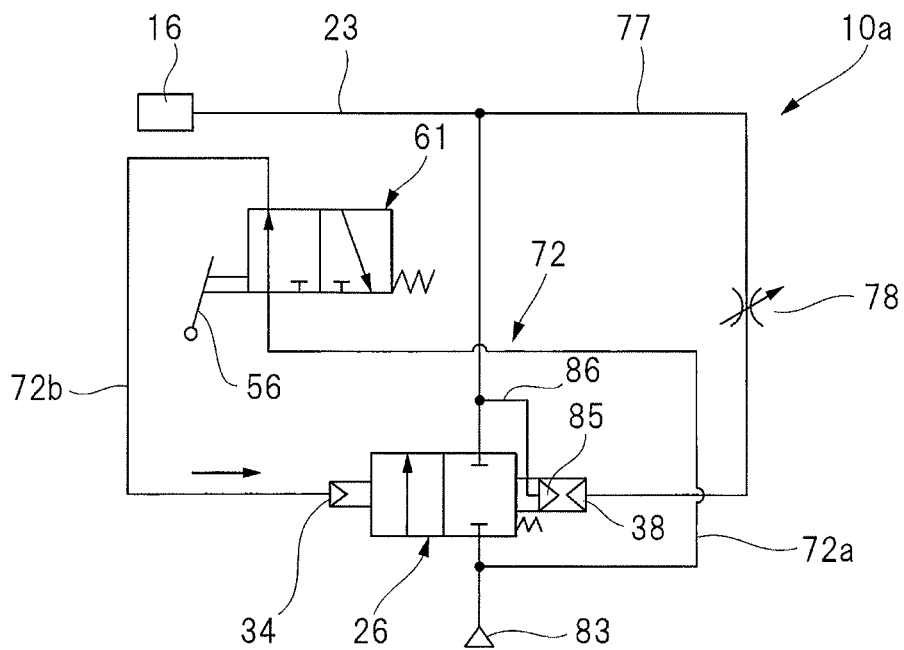
Figure 11:
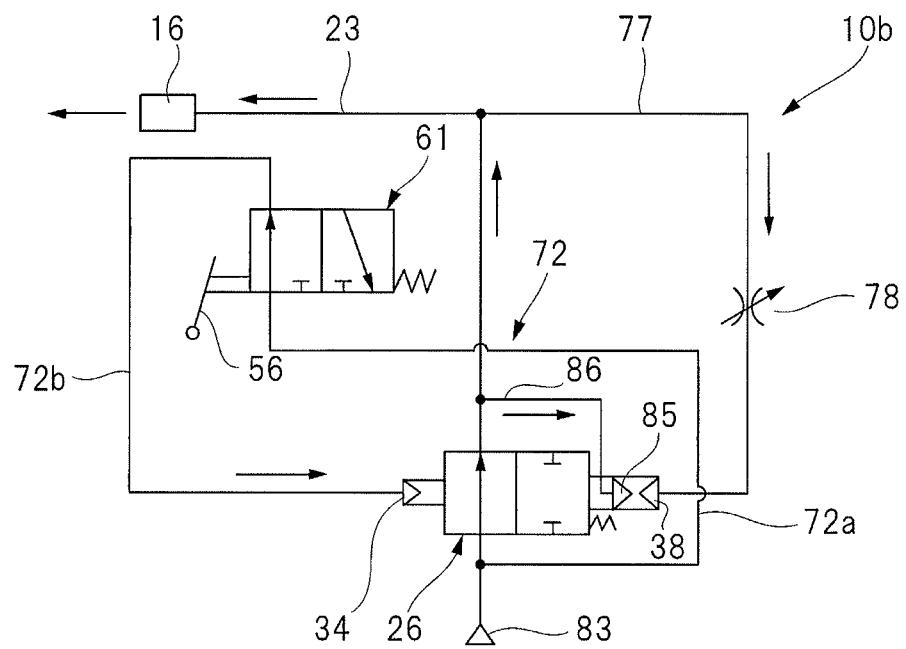
FIGS. 11(a) and 11(b) are pneumatic circuit diagrams each showing the intermittent air blow gun of FIG. 8, FIG. 11(a) showing it with a main valve located at an open position by air supplied to a small-diameter pilot chamber by operating the trigger lever, FIG. 11(b) showing it with the main valve located at an closed position by air supplied to a large-diameter pilot chamber.
Figure 11:
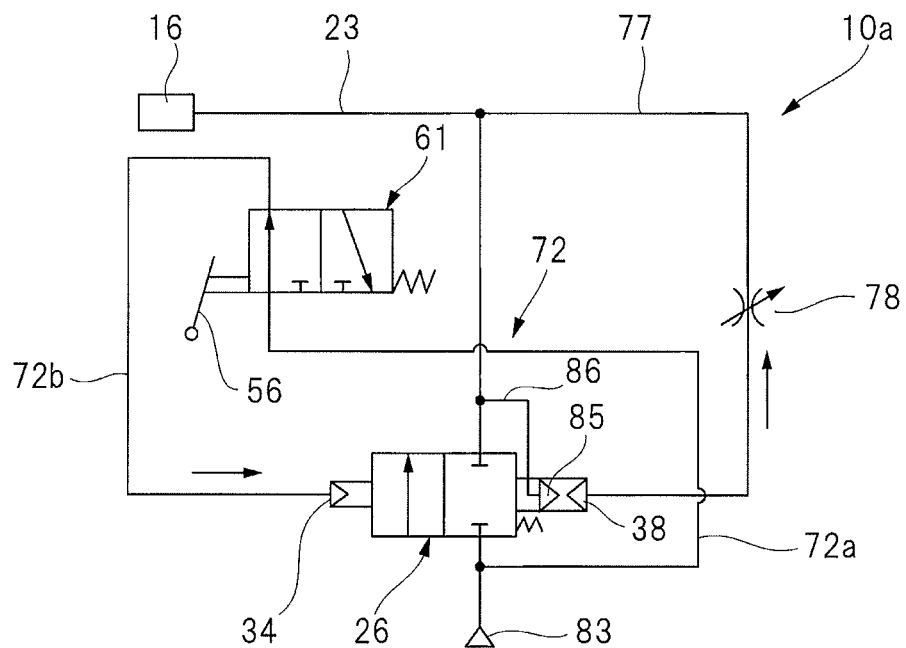

FIGS. 10 and 11 are pneumatic circuit diagrams each showing the intermittent air blow gun 10*b*. An intermittent discharge operation of air from the discharge nozzle 16 will be described with reference to these figures. However, an air pressure graphic symbol denoting the switching valve 26 is created in order to explain the present invention, and is not a symbol approved according to the JIS standard and the like.

Air supplied to a switching-valve input port 22 is supplied to a small-diameter pilot chamber 34 through a trigger valve 61 when a trigger lever 56 is switched from an actuation stop state shown in FIG. 10(A) to an actuation position shown in FIG. 10(B). As a result, the valve hole 51 is opened by the valve body 53, so that the switching valve 26 becomes in an ON state, as shown in FIG. 11(A). When the switching valve 26 becomes in the ON state, air in a primary chamber 52a flows into a secondary chamber 52b and is discharged from the secondary chamber 52b to the discharge nozzle 16 through an air discharge pipe 23. Furthermore, air in the secondary chamber 52b passes through the delay bypass flow path 86 communicating with the output communication hole 47 and is supplied to the delay pilot chamber 85. Accordingly, the pressing force (C) in the direction in which the ON state is maintained is applied to the large-diameter piston 37.

Part of air in a switching-valve output port 25 is supplied to the large-diameter pilot chamber 38 through the bypass flow path 77 and the throttle 78, so that the pressure of the large-diameter pilot chamber 38 is gradually increased for time depending on the throttling of the throttle 78. The large-diameter piston 37 is moved in a closure direction to move the main shaft 32 when the pressure of the large-diameter pilot chamber 38 is sufficiently increased, so that the thrust of the total of pressing force to the large-diameter piston 37, caused by the pressure of the large-diameter pilot chamber 38, and the spring force of a compression coil spring 55, i.e., the pressing force (B) in the direction in which the valve body 53 is closed becomes greater than the thrust of the total of the pressing force (C) to the large-diameter piston 37, caused by the pressure of the delay pilot chamber 85, and the pressing force (A) to a small-diameter piston 33, caused by the pressure of the small-diameter pilot chamber 34. As a result, the valve hole 51 is closed, and the switching valve 26 is switched to a discharge stop state, i.e., an OFF state.

When the valve hole 51 is closed, air in the secondary chamber 52b is released from a discharge opening 16a to the atmosphere through the switching-valve output port 25, thereby decreasing the pressure of the secondary chamber 52b. At the same time, the pressures of the delay pilot chamber 85 and the large-diameter pilot chamber 38 also start to decrease.

Air in the delay pilot chamber 85 is released into the discharge opening 16a to the atmosphere through the delay bypass flow path 86 and the switching-valve output port 25. Since the flow path is short and is not throttled, the pressure of the delay pilot chamber 85 is quickly decreased. In contrast, air in the large-diameter pilot chamber 38 is released into the switching-valve output port 25 to the atmosphere through the bypass flow path 77 and the throttle 78. Since the flow path is throttled, the pressure of the large-diameter pilot chamber 38 is slowly decreased. As described above, force generated in a closure direction in the large-diameter pilot chamber 38 is maintained for a long period of time, and therefore, the time of the OFF state is longer than that in the case of the intermittent air blow gun 10a. A return to the ON state of FIG. 11(A) is achieved when the pressure of the large-diameter pilot chamber 38 is sufficiently decreased.

Figure 12:
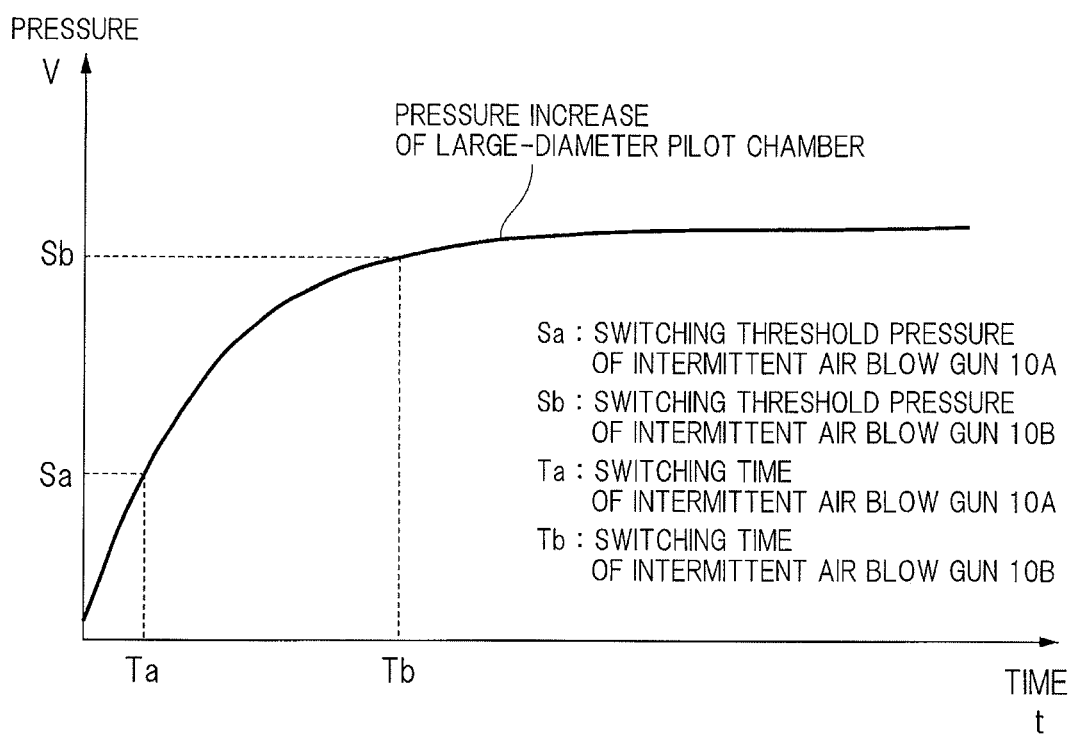
FIG. 12 is a characteristic diagram an ON/OFF period of "ON" and "OFF" states of air from a discharge nozzle.

FIG. 12 is a characteristic diagram showing a relationship between a rise in pressure of the large-diameter pilot chamber 38 (vertical axis) and a switching time at which the switching valve 26 is switched from an ON state to an OFF state (horizontal axis). In FIG. 12, the switching threshold pressure of the large-diameter pilot chamber 38 at the time of switching the intermittent air blow gun 10a shown in FIG. 1 from an ON state to an OFF state is denoted by reference character Sa, while the similar switching threshold pressure of the intermittent air blow gun 10b shown in FIG. 8 is denoted by reference character Sb.

The intermittent air blow gun 10a shown in FIGS. 1 to 5 is not provided with a delay bypass flow path 86, the perforated chamber 39 is opened to the atmosphere through the through hole, and therefore, pressing force (C) is not generated. Force against pressing force in the closing direction of the valve hole 51, i.e., force for opening the valve hole 51 is only the pressing force (A) to the small-diameter piston 33. Accordingly, the large-diameter piston 37 is directly pushed to close the valve body 53 when the pressing force (B) is increased. The valve hole 51 is closed when the pressure of the large-diameter pilot chamber 38 becomes more than the switching threshold pressure Sa.

In contrast, in the intermittent air blow gun 10b shown in FIGS. 8 and 9, air is supplied from the secondary chamber 52b to the delay pilot chamber 85, and therefore, the pressing force (C) in the opening direction of the valve hole 51 is applied to the large-diameter piston 37. Herein, the minimum value of the pressure of the large-diameter pilot chamber 38, required for moving the large-diameter piston 37 in the closure direction against the pressing force (C), is regarded as the switching threshold pressure Sb. The switching threshold pressure Sb is higher than the switching threshold pressure Sa because the pressing force (C) is applied to the large-diameter piston 37. Accordingly, a time until the pressure of the large-diameter pilot chamber 38 is increased to the switching threshold pressure Sb to close the switching valve 26, i.e., a switching time Tb is longer than the switching time Ta of the intermittent air blow gun 10a, as shown in FIG. 12. As a result, the ON time of the intermittent air blow gun 10b is longer than that of the intermittent air blow gun 10a.

The time from switching to the OFF state to switching to the ON state, i.e., the OFF time of the intermittent air blow gun 10b is longer than that of the intermittent air blow gun 10a. This is because of the following operation to be performed after having closed the switching valve 26.

When the switching valve 26 is closed, air in the delay pilot chamber 85 is exhausted to the outside through the delay bypass flow path 86 and the switching-valve output port 25 immediately. In other words, the pressure of the delay pilot chamber 85, i.e., the pressing force (C) reaches zero immediately when the switching valve 26 is closed. In contrast, air in the large-diameter pilot chamber 38 is exhausted to the outside through the throttle 78, and therefore, the pressure of the large-diameter pilot chamber 38, i.e., the pressing force (B) is gradually decreased. As described above, the pressing force (B) is gradually decreased whereas the pressing force (C) immediately reaches zero, after the switching valve 26 has been closed. Accordingly, the time from closing to opening of the switching valve 26 of the intermittent air blow gun 10b is longer than that of the intermittent air blow gun 10a.

In the intermittent air blow gun 10b, it is possible to secure the flow rate of air to be discharged from the discharge nozzle 16 while achieving the reduction in size of the gun, and the ON time and OFF time of the intermittent discharge can be allowed to be longer than those in the intermittent air blow gun 10a, as described above.

Figure 13:
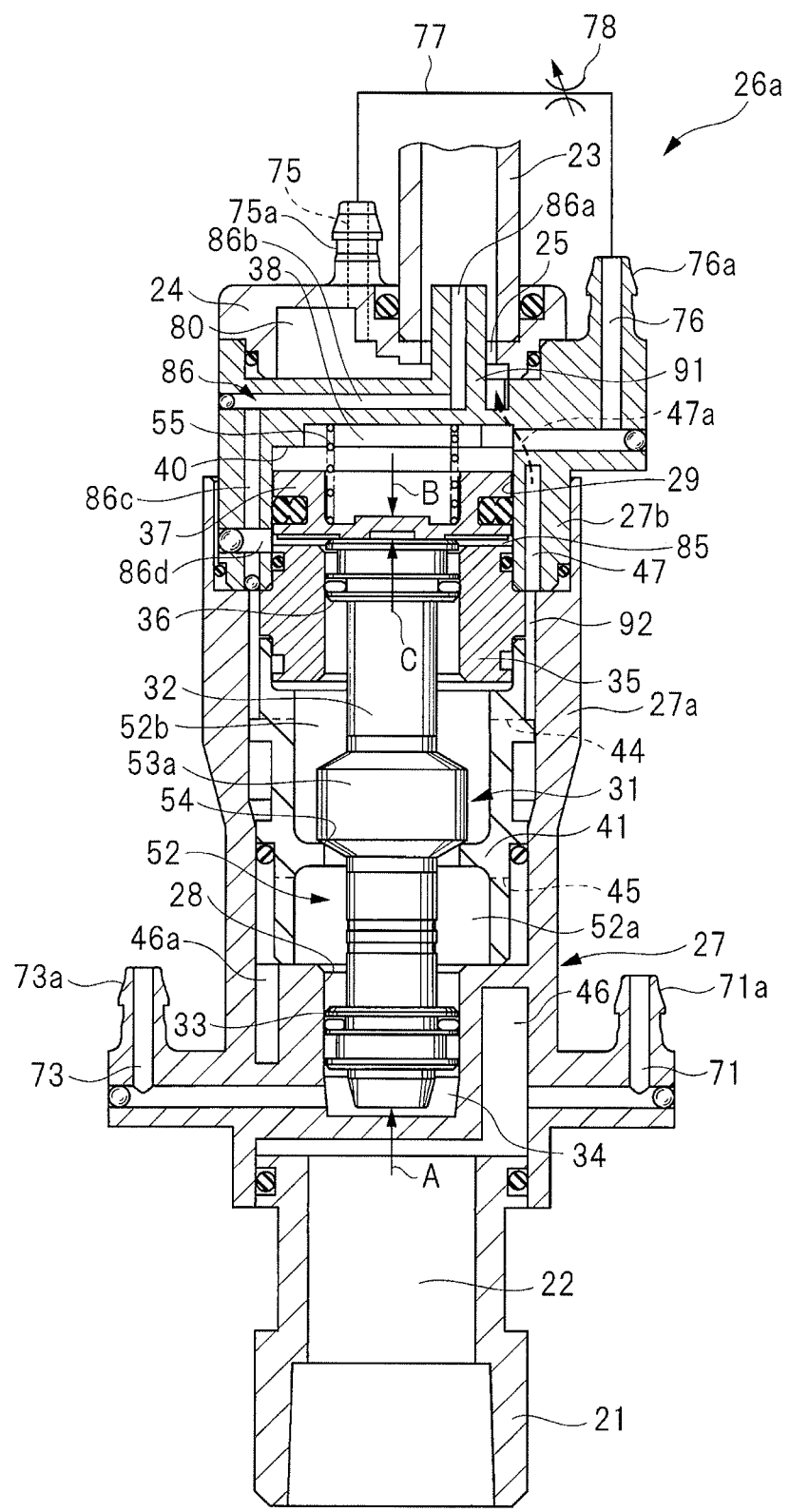
FIG. 13 is a sectional view of a main valve according to another embodiment of the present invention.

FIG. 13 is a cross-sectional view showing a switching valve 26a of an alternative embodiment, and members common to the members shown in FIG. 9 are denoted by the same reference characters. A delay pilot pressure inlet 91 is provided to a second case piece 27b, and the delay pilot pressure inlet 91 protrudes into the inside of an air discharge section 24, penetrates a communication chamber 80 and a switching-valve output port 25, and protrudes into the inside of an air discharge pipe 23. A flow path is formed by a gap between the delay pilot pressure inlet 91 and the switching-valve output port 25. An output communication hole 47 is configured to communicate with the switching-valve output port 25 and the communication chamber 80 through a flow path 47a denoted by a dashed line, and air flowed out into the output communication hole 47 flows out into the air discharge pipe 23 and flows from the communication chamber 80 to a bypass flow path 77.

An input communication hole 46 formed in a first case piece 27a is configured to communicate with a communication hole 46a opened in a gap between the first case piece 27a and a valve seat member 41. The communication hole 46a is configured to communicate with a primary chamber 52a through a passage 45 formed in the valve seat member 41. A passage 44 communicating with a secondary chamber 52b is formed in the valve seat member 41, and the passage 44 is configured to communicate with a communication hole 92 having a cylindrical shape formed between the first case piece 27a and a main shaft guide 35. The communication hole 92 is configured to communicate with the output communication hole 47 formed in the second case piece 27b.

The delay pilot pressure inlet 91 has an introduction flow path 86a longitudinally disposed therein and opened to the air discharge pipe 23. A communication flow path 86b configured to communicate with the introduction flow path 86a and laterally extends is provided to a switching-valve case 27, a communication flow path 86c configured to communicate with the communication flow path 86b and longitudinally extends is provided to the switching-valve case 27, and the communication flow path 86c configured to communicate with a delay pilot chamber 85 through a communication flow path 86d. As described above, a delay bypass flow path 86 is formed by the introduction flow path 86a and the communication flow paths 86b, 86c, and 86d.

As described above, the delay pilot chamber 85 is configured to communicate with the delay pilot pressure inlet 91 extending so as to penetrate the communication chamber 80 and so as to protrude into the air discharge pipe 23, and air flowed from the communication chamber 80 into the air discharge pipe 23 is supplied to the delay pilot chamber 85. In the switching valve 26 shown in FIG. 9, air is introduced from a spot in which air flows from a passage 44 into the output communication hole 47, i.e., a spot at a pressure close to a primary pressure, into the delay pilot chamber 85. In contrast, in the switching valve 26a shown in FIG. 13, air is introduced from the inside of the air discharge pipe 23 apart from the output communication hole 47, i.e., from a secondary pressure far from a primary pressure, into the delay pilot chamber 85. As a result, the switching valve 26a shown in FIG. 13 enables a delay time to be longer than the switching valve 26 shown in FIG. 9.

An intermittent air blow gun 10b including a switching valve 26a shown in FIG. 13 acts in the same way as an intermittent air blow gun 10b including a switching valve 26 shown in FIGS. 9 to 11.

The present invention is not limited to the embodiments but can be variously modified without departing from the gist of the present invention. For example, the delay bypass flow path 86 can be provided to the main shaft guide 35 or the main shaft 32, between the main shaft guide 35 and the main shaft 32, or between the main shaft guide 35 and the switching-valve case 27 although the delay bypass flow path 86 is provided to the switching-valve case 27 in the embodiments described above. In other words, the delay bypass flow path 86 may be disposed anywhere if air flowed into the secondary chamber 52b can be introduced into the delay pilot chamber 85.

The intermittent air blow gun is used for intermittently spraying an object with compressed air to remove chips of a workpiece, dust on a surface to be coated, or the like.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:
1. A switching valve comprising:
   a switching-valve case in which an air intake section provided with a switching-valve input port and a small-diameter hole are provided to one end thereof, in which an air discharge section provided with a switching-valve output port and a large-diameter hole larger in inner diameter than the small-diameter hole are provided to the other end thereof, and in which a valve chamber configured to communicate with the switching-valve input port and the switching-valve output port is provided;
   a valve seat member provided in the valve chamber and having a valve hole;
   a valve assembly comprising: a main shaft provided with a valve body configured to open and close the valve hole, the valve body being formed by a large-diameter section that has a large diameter larger than an inner diameter of the valve hole; a small-diameter piston incorporated into the small-diameter hole so as to form a small-diameter pilot chamber; and a large-diameter piston incorporated into the large-diameter hole so as to form a large-diameter pilot chamber, and arranged in the switching-valve case;
   a bypass flow path through which the switching-valve output port and the large-diameter pilot chamber communicate with each other, air discharged to the switching-valve output port being supplied to the large-diameter pilot chamber to switch and cause the valve body to take a closed position, and air being exhausted from the large-diameter pilot chamber to switch and cause the valve body to take an open position;
   a spring member configured to bias the valve assembly in a closing direction of the valve hole and attached to the large-diameter pilot chamber;
   a delay pilot chamber formed on an opposite side of the large-diameter pilot chamber through the large-diameter piston;
   a delay bypass flow path provided so that air passed through the valve hole is supplied to the delay pilot chamber; and
   an output communication hole communicating with the valve body and the switching-valve output port,
   wherein the main shaft and the large-diameter piston are separated,
   the delay pilot chamber is formed between the main shaft and the large-diameter piston, and
   the delay bypass flow path communicates with the delay pilot chamber and the output communication hole.
2. The switching valve according to claim 1, wherein the small-diameter hole and the large-diameter hole are formed between the switching-valve input port and the switching-valve output port.

3. The switching valve according to claim 2, wherein the switching-valve input port, the small-diameter pilot chamber, the valve chamber, the large-diameter pilot chamber, and the switching-valve output port are arranged in this order from one end to the other end of the switching-valve case along a moving direction of the valve assembly.

4. The switching valve according to claim 1, wherein an introduction flow path for the delay bypass flow path is provided to a delay pilot pressure inlet, and protrudes to an inside of the air discharge section.

5. An intermittent air blow gun comprising:
a switching valve comprising:
   a switching-valve case in which an air intake section provided with a switching-valve input port and a small-diameter hole are provided to one end thereof, in which an air discharge section provided with a switching-valve output port and a large-diameter hole larger in inner diameter than the small-diameter hole are provided to the other end thereof, and in which a valve chamber configured to communicate with the switching-valve input port and the switching-valve output port is provided;
   a valve seat member provided in the valve chamber and having a valve hole;
   a valve assembly comprising: a main shaft provided with a valve body configured to open and close the valve hole, the valve body being formed by a large-diameter section that has a large diameter larger than an inner diameter of the valve hole; a small-diameter piston incorporated into the small-diameter hole so as to form a small-diameter pilot chamber; and a large-diameter piston incorporated into the large-diameter hole so as to form a large-diameter pilot chamber, and arranged in the switching-valve case; and
   a bypass flow path through which the switching-valve output port and the large-diameter pilot chamber communicate with each other, air discharged to the switching-valve output port being supplied to the large-diameter pilot chamber to switch and cause the valve body to take a closed position, and air being exhausted from the large-diameter pilot chamber to switch and cause the valve body to take an open position;
   a spring member configured to bias the valve assembly in a closing direction of the valve hole and attached to the large-diameter pilot chamber;
   a delay pilot chamber formed on an opposite side of the large-diameter pilot chamber through the large-diameter piston;
   a delay bypass flow path provided so that air passed through the valve hole is supplied to the delay pilot chamber; and
   an output communication hole communicating with the valve body and the switching-valve output port,
   wherein the main shaft and the large-diameter piston are separated,
   the delay pilot chamber is formed between the main shaft and the large-diameter piston, and
   the delay bypass flow path communicates with the delay pilot chamber and the output communication hole; and
   a trigger valve to be switched between an actuation position allowing air supplied to the air intake section to be supplied to the small-diameter pilot chamber and an actuation stop position stopping air from being supplied to the small-diameter pilot chamber, and exhausting air in the small-diameter pilot chamber to an outside.

6. The intermittent air blow gun according to claim 5, further comprising: a nozzle communicating with the air discharge section of the switching valve; a grip section gripped by an operator; and a case formed with a housing space,
   wherein the switching valve and the trigger valve are arranged in the housing space.

7. The intermittent air blow gun according to claim 6, wherein
   the switching valve comprises:
   a trigger flow path provided to the trigger valve and configured to allow the switching-valve input port and the small-diameter pilot chamber to communicate with each other;
   an air-supply port configured to allow the trigger flow path and the switching-valve input port to communicate with each other; and
   a pilot port configured to allow the trigger flow path and the small-diameter pilot chamber to communicate with each other; and
   the air-supply port and the pilot port are arranged along the cross-sectional longitudinal direction of the grip section.

8. The intermittent air blow gun according to claim 6, wherein
   a variable throttle configured to adjust a flow rate of air flowing through the bypass flow path is provided to the bypass flow path; and
   the variable throttle is arranged in the housing space and capable of adjusting a flow rate of air from an outside of the case.

9. The intermittent air blow gun according to claim 6, wherein
   operation means configured to switch the trigger valve between an actuation position and an actuation stop position is provided outside the case.

10. The intermittent air blow gun according to claim 9, wherein the operation means is a trigger lever that is swingably disposed in the case.

* * * * *